(12) United States Patent
Vinciguerra et al.

(10) Patent No.: US 10,346,971 B2
(45) Date of Patent: Jul. 9, 2019

(54) OPTIMIZED METHOD FOR ANALYZING THE CONFORMITY OF THE SURFACE OF A TIRE

(71) Applicant: COMPAGNIE GENERALE DES ETABLISSEMENTS MICHELIN, Clermont-Ferrand (FR)

(72) Inventors: Régis Vinciguerra, Clermont-Ferrand (FR); Steve Bourgeois, Clermont-Ferrand (FR); Alexandre Joly, Clermont-Ferrand (FR); Alexandre Chariot, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/741,378

(22) PCT Filed: Jul. 26, 2016

(86) PCT No.: PCT/FR2016/051941
§ 371 (c)(1),
(2) Date: Jan. 2, 2018

(87) PCT Pub. No.: WO2017/017371
PCT Pub. Date: Feb. 2, 2017

(65) Prior Publication Data
US 2018/0197285 A1    Jul. 12, 2018

(30) Foreign Application Priority Data
Jul. 27, 2015 (FR) .................................... 15 57142

(51) Int. Cl.
*G06T 7/00* (2017.01)
*G06T 7/33* (2017.01)
*G06T 7/90* (2017.01)

(52) U.S. Cl.
CPC .............. *G06T 7/001* (2013.01); *G06T 7/337* (2017.01); *G06T 7/90* (2017.01); *G06T 2207/10024* (2013.01); *G06T 2207/30108* (2013.01)

(58) Field of Classification Search
CPC . G06T 2207/10024; G06T 2207/30108; G06T 7/001; G06T 7/337; G06T 7/90
See application file for complete search history.

(56) References Cited

U.S. PATENT DOCUMENTS

| 3,302,519 A | 2/1967 | Young | 88/24 |
| 3,339,683 A | 9/1967 | Burnett | 188/196 |

(Continued)

FOREIGN PATENT DOCUMENTS

| FR | 1 462 898 | 12/1966 |
| FR | 1 462 901 | 12/1966 |

(Continued)

OTHER PUBLICATIONS

Nov. 14, 2016 International Search Report and Written Opinion in International Patent Appln. No. PCT/FR2016/051941.

(Continued)

*Primary Examiner* — Manuchehr Rahmjoo
(74) *Attorney, Agent, or Firm* — Venable LLP

(57) ABSTRACT

A method for inspecting a tire's surface includes: capturing a reference image of a reference tire's surface relief elements and transmitting data of the reference image to a processor; parameterizing main characteristics of the reference image via interaction of an operator with the processor; producing a reference map of the surface relief elements by dividing (Continued)

the reference image into a plurality of reference zones of interest; assigning a specific registration and checking algorithm to each of the reference zones of interest; capturing an inspection image of a tire under inspection; and, after completion of pre-processing of the inspection image, automatically: superimposing the reference map on the inspection image, and, for each of a plurality of zones of interest of the inspection image, running the specific registration and checking algorithm for a corresponding one of the reference zones of interest, to determine a conformity of the tire under inspection.

14 Claims, 4 Drawing Sheets

(56) References Cited

U.S. PATENT DOCUMENTS

| | | | |
|---|---|---|---|
| 8,659,653 B2 | 2/2014 | Joly et al. | 348/92 |
| 9,002,063 B2 | 4/2015 | Joly et al. | G01M 17/02 |
| 9,002,130 B2 | 4/2015 | Noyel et al. | G01M 17/027 |
| 9,008,368 B2 | 4/2015 | Joly et al. | G06T 7/0002 |
| 9,025,853 B2 | 5/2015 | Noyel et al. | G06T 7/0004 |
| 9,123,112 B2 | 9/2015 | Vinciguerra et al. | G06T 3/0056 |
| 9,189,841 B2 | 11/2015 | Noyel et al. | G06T 7/0004 |
| 9,224,198 B2 | 12/2015 | Zanella et al. | G06T 7/0008 |
| 2011/0019903 A1 | 1/2011 | Joly et al. | 382/141 |
| 2011/0222754 A1 | 9/2011 | Zhao et al. | 382/141 |
| 2013/0208949 A1 | 8/2013 | Joly et al. | 382/103 |
| 2013/0266189 A1 | 10/2013 | Vinciguerra et al. | G06T 7/0004 |
| 2013/0266225 A1 | 10/2013 | Vinciguerra et al. | 382/190 |
| 2014/0219541 A1 | 8/2014 | Noyel et al. | 382/141 |
| 2016/0133000 A1 | 5/2016 | Bourgeois et al. | G06T 7/001 |
| 2017/0148146 A1 | 5/2017 | Joly et al. | G06T 5/006 |
| 2017/0330338 A1 | 11/2017 | Joly et al. | G06T 7/40 |
| 2018/0189939 A1* | 7/2018 | Ghidotti Piovan | G01M 17/027 |

FOREIGN PATENT DOCUMENTS

| | | |
|---|---|---|
| WO | WO 2009/077534 A1 | 6/2009 |
| WO | WO 2009/077539 A2 | 6/2009 |
| WO | WO 2012/052300 A1 | 4/2012 |
| WO | WO 2012/055748 A1 | 5/2012 |
| WO | WO 2012/143197 A1 | 10/2012 |
| WO | WO 2012/156262 A1 | 11/2012 |
| WO | WO 2013/045593 A1 | 4/2013 |
| WO | WO 2014/198777 A1 | 12/2014 |

OTHER PUBLICATIONS

"The New Image of Automatic Defect Recognition," retrieved from: http://web.archive.org/web/20140112110350/http://www.ndtnet.com/m/yxlon/auto_img_paper.htm (Jan. 12, 2014).

A. Wilson, "3-D vision system checks tires," Vision Systems Design, vol. 11, No. 2, pp. 1-8 (Feb. 1, 2006).

A. Khotanzad et al., "Invariant Image Recognition by Zernike Moments," IEEE Transactions on Pattern Analysis and Machine Intelligence, vol. 12, No. 5, pp. 489-497, May 1990.

* cited by examiner

OPTIMIZED METHOD FOR ANALYZING THE CONFORMITY OF THE SURFACE OF A TIRE

FIELD OF THE INVENTION

The invention relates in a general way to the field of tire manufacture, and lies more particularly within the context of operations for checking the appearance of tires in the course of the manufacturing process or at the end thereof, with the aim of determining the conformity of said tires with checking references.

RELATED ART

The industrial means for automatic tire checking developed by manufacturers and intended, notably, to assist operators responsible for visual checking, are commonly based on image processing techniques.

The methods used to perform this processing usually consist in comparing a two- or preferably three-dimensional image of the surface of the tire to be inspected with a two- or preferably three-dimensional reference image of the surface of said tire.

In a known way, one of the steps of this process has the aim of acquiring the three-dimensional image of the surface of the tire, for example with the aid of means based on the principle of optical triangulation, using, for example, a 2D sensor coupled to a laser illumination source. The two-dimensional image is obtained using the same capture means, and in this case it consists of a simple photograph of the surface. This two-dimensional image may also be obtained by any acquisition means such as a line scan camera, or may be calculated at the same time as the three-dimensional image in the case of optical triangulation on the basis of the intensity of the laser ray projected on to the tire.

The image of the surface of the tire is formed by the set of digital data resulting from the capture of the three-dimensional and two-dimensional images. These data, obtained from the sensor, are transmitted to a processor whose memory contains code instructions which, when executed, are capable of processing very high volumes of data.

In the following steps, a certain number of pre-processes are performed to facilitate the use of the data forming the image of the tire surface.

In the continuation of the process, provision is made to register the relief surface of the tire to be inspected with the image of the reference relief surface. This step has proven to be particularly complicated because of the local deformation caused by the release of stresses on leaving the curing mould. This reference image may be obtained from a CAD model, or from a model used for designing the mould in which the tire is produced, or alternatively from a reference tire that is assumed to be free of anomalies.

Thus the publication WO2009077539 proposes to provide an affine transformation by attempting to make characteristic points, previously identified on the surface of the tire to be inspected and on the reference surface, coincide.

The publication WO2012/055748 is based on the use of the particular properties of B-spline surfaces for making said characteristic points coincide locally.

The publication WO2012/052300 proposes a method for registering the patterns of a tread by making basic patterns coincide, these patterns being sequenced in a known way, using basic patterns including a wear indicator forming a characteristic and easily identifiable subimage.

The process concludes with the use of digital methods for inspection and anomaly tracing, or quite simply by comparing the image of the tire to be inspected with the reference image.

The publication WO2013/045593 proposes a method for processing two-dimensional images of smooth surfaces by morphological analysis. The publication WO2012/143197 is more particularly concerned with the processing of the non-measurement points created by shadow zones formed by sprues. The applications FR1462901 and FR1462898, not yet published, propose algorithms for detecting and analysing the conformity of the striations present on the surface of the sidewall of the tire, which are less costly in calculation time than the conventional methods using Fourier transformation or three-dimensional image analysis.

However, it has been found that these tools provide good results for the analysis of specific relief elements of the tire surface, such as patterns or text zones, or tread patterns, the sprues created by the mould venting means, smooth zones, striations or text zones appearing on removable plates.

All these algorithms have the characteristic of being costly in terms of calculation time, particularly if they are used on the whole surface of the tire to be inspected.

BRIEF DESCRIPTION OF EMBODIMENTS OF THE INVENTION

The invention proposes to make a contribution which will reduce the calculation times required for inspecting tires at the end of a manufacturing process line, while allowing the identification of distinct zones of interest on which specific algorithms will be used.

According to the invention, the method for inspecting a surface of a tire to be inspected by comparison with a reference surface of a reference tire, said surfaces comprising relief elements or markings, is characterized in that steps are executed in the course of which:

an acquisition system is used to capture an image of the relief of the surface of a reference tire selected from the manufacturing process and considered to be in conformity, this image being formed by a two-dimensional grey level or colour image, and a three-dimensional grey level image in which each point of the image is assigned a grey level value proportional to the topographic elevation of this point, and the resulting data are transmitted to a processor containing in its memory coded instructions which, when executed, enable the steps of the method to be performed, the main characteristics are parameterized by the interaction of an operator with said processor, and a map of the reference surface of the reference tire is produced by dividing the image of the reference surface of the reference tire into a plurality of distinct zones of interest, each of the zones of interest comprising a characteristic shape or relief, the zones of interest being separated by boundaries, and one or more registration and checking algorithms, chosen from a collection of algorithms established previously and stored in a memory of said processor, are assigned to each of the previously identified zones of interest, said acquisition system is used to capture an image of the relief of the surface to be inspected of a tire to be inspected that has come from the same mould as the reference tire and that is different from this reference tire, and the resulting data are transmitted to the processor, in an automatic way, and on the basis of the main characteristics defined previously and recorded in the memory of the processor, said processor performs, by executing the coded instructions, the operations in which:

at least one pre-processing of the acquired image is performed, said map is superimposed on the image of the surface to be inspected of said tire to be inspected, so as to determine the zones of interest of the tire to be inspected, and the registration and checking algorithms specific to each of the zones of interest of the tire to be inspected are run, to determine the conformity of the tire.

Thus the method provides for the preparatory execution of a lengthy and sometimes complex parameterization of the reference envelope, so that the most optimal parameters forming the main characteristics of the zones of interest of the reference tire are defined, and so that the algorithm or algorithms most suitable for each of these zones of interest are carefully chosen.

By means of this preliminary work, it is then possible, during the inspection phase in routine operation, to carry out only the processes most suitable for the registration and subsequent checking of a particular zone of interest. These processes are chosen for low complexity and particularly high performance, mainly when they are applied to zones which are uniform in terms of the characteristics of the zone of interest concerned.

Consequently, for a processor with a given computing power, the invention makes it possible to reduce the calculation time required to estimate the conformity of a tire casing during the checking phase, and to perform this checking at a rate compatible with the tempo of industrial manufacture.

The "surface of a tire" is here taken to mean a surface formed by some or all of the surfaces formed by the internal surface or by the external surface of the tire comprising the sidewall, the shoulders, the bead, or the tread. Clearly, if the reference surface of the reference tire represents only one part of the tire surface, such as the sidewall, the tread or the internal part, the surface to be inspected of the tire to be inspected represents the surface located on an identical part of the tire, that is to say, respectively, the sidewall, the tread or the internal part.

The method according to the invention may also have the following characteristics, separately or in combination:

the pre-processing of the acquired image comprises one or more processes chosen from among the following algorithms:

a flattening of the radial profile of the surface, the conversion of the polar coordinates of the image of the surface of the sidewall of the tire, expressed relative to the axis of rotation of the tire, to Cartesian coordinates, corrections relating to defects of the optical system carrying out the acquisition, such as the correction of localized optical deformations or the correction of shadow zones.

the parameterization of the main characteristics of the reference tire comprises data chosen from among the following characteristics:

a sum of the value of the grey levels of the columns and rows of the raw or filtered three-dimensional image, forming a one-dimensional signature, a mean curvature of the sidewall, a shape of the contour of a characteristic relief present in a given zone of interest, forming characteristic subimages in two dimensions, one or more characteristic points of a characteristic relief present in a zone of interest, a geometric moment, one or more geometric measurements between the characteristic points, such as distances or angles, a response to a morphological operator based on a structuring element having a given shape and orientation, a reference image of the orientation of the elevation gradients with the steepest slope of a blow hole, morphological filters and responses to characterizations of the texture type.

the collection of registration algorithms comprises at least one registration method for making the relief of a zone of interest of the reference surface coincide with the relief of the zone of interest of the surface to be inspected.

the registration method is chosen, in increasing order of complexity, from among one or more of the following methods:

matching one-dimensional signatures and angular registration, matching characteristic points, matching characteristic subimages, matching reliefs in three dimensions.

the collection of algorithms comprises first level algorithms based on analyses such as the comparison of the contours of the characteristic subimages, the comparison of the geometric measurements between the characteristic points, and the comparison of the geometric moments.

the collection of checking algorithms comprises at least one specific method for analysing the zones of interest in which the characteristic relief is formed by one or more alphanumeric characters.

the collection of checking algorithms comprises at least one specific method for analysing the zones of interest in which the characteristic relief is formed by striations.

the collection of checking algorithms comprises at least one specific method for analysing the zones of interest in which the characteristic relief is smooth.

the collection of checking algorithms comprises at least one specific method for analysing the zones of interest in which the characteristic relief is formed by a removable plate.

the collection of checking algorithms comprises at least one specific method for analysing the zones of interest in which the characteristic relief comprises a sprue.

the collection of checking algorithms comprises at least one specific method for analysing the zones of interest in which the characteristic relief is formed by the tread.

the collection of checking algorithms comprises at least one specific method for analysing the zones of interest in which the characteristic relief comprises a wear indicator.

the collection of checking algorithms comprises at least one specific method for analysing the zones of interest in which the characteristic relief comprises texture.

Finally, the invention comprises a computer program comprising coded instructions which, when the program is run on a computer, cause the steps of the above method to be executed.

BRIEF DESCRIPTION OF THE DRAWINGS

The invention will be more readily understood from a perusal of the attached drawings, which are provided by way of example and are not in any way limiting, and in which.

DETAILED DESCRIPTION OF EMBODIMENTS OF THE INVENTION

Figure 1:
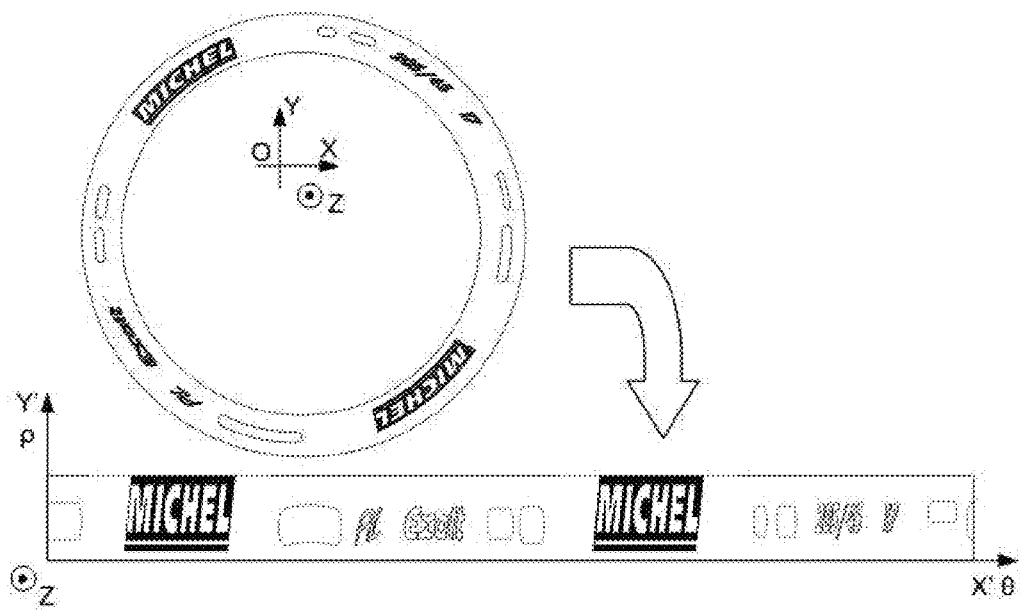
FIG. 1 shows schematically the operation of changing coordinates, performed during the pre-processing of the image of the surface.

As mentioned above, the image of the tire surface may be a two-dimensional image, similar to a photograph, which is representative of the appearance of the surface. This image may be a black and white image or a colour image. It reflects the colour or the grey level, as well as the brightness.

This results in a set of points, or pixels, arranged on a plane, whose grey level corresponds to the light reflected by the surface of the tire.

In addition to techniques based on optical triangulation, the acquisition of the topographic image of the surface of the sidewall may be performed by the conventional stereovision, in which it is proposed to use two separate cameras dedicated to the acquisition of data relating to the relief. The two cameras are positioned so that the surface to be inspected can be recorded at different angles of view. With this technology, after the step of acquiring two-dimensional images from the two cameras, it is also useful to match these images so as to associate the image points formed in each of the images produced by each of the cameras with a given point on the surface to be inspected. The three-dimensional coordinates of the point on the surface are then calculated by triangulation, by determining, after the calibration of the cameras, the different angles of view of this point on the surface as viewed by the two cameras.

This results in a cloud of points distributed in three-dimensional space and representative of the surface of the sidewall.

A device capable of recording both views simultaneously in a single rotation of the tire is described, by way of example, in the publication WO 2009/077534.

The raw data of the two-dimensional image and the three-dimensional image which together form the image of the tire surface, and which are obtained by the acquisition system, are then transmitted to a processor containing the coded instructions which, when run by said processor, enable the various steps of the method to be executed.

To facilitate the execution of further processing, a certain number of pre-processing operations are usually performed on the image. This pre-processing is adjusted by an operator interacting with the processor, using the digital data obtained from the reference image of the reference tire.

To perform this pre-processing, the operator may make use of data previously introduced into the memory of the processor, such as CAD design data associated with the tire being processed, as well as specific algorithms, the processing steps of which are not included in the scope of the present invention.

This initial operation makes it possible to determine a set of main characteristics related to the particular size of the tire. These main characteristics are intended to be re-used by the processor for performing the pre-processing, or for executing the checking algorithms for each of the tire casings to be inspected.

The pre-processing may comprise a first operation consisting in recalibrating the two-dimensional image, so as to correct the shadow zones created by variations in illumination during the recording of a view, or to correct the deformations related to the optical system, which are specific to the acquisition system used. These shadow zones or deformations are reproduced whenever a view is recorded.

When the image of the reference tire is analysed, the operator then determines the compensations to be provided and records these compensations in the main characteristics of the dimension, so that the same compensations are applied to all the tires to be inspected of the same size as the reference tire.

For the sake of convenience, the three-dimensional image is also re-worked.

Provision is made for the three-dimensional coordinates x, y, z of surfaces to be analysed to be expressed in an orthonormal reference frame OX, OY, OZ, in which the axis OZ substantially coincides with the axis of rotation of the tire. It is then easy to convert the coordinates x, y, z by projection in the plane OXY and to change the Cartesian coordinates x, y in the plane OXY into polar coordinates of the type p, θ, as shown in FIG. 1.

Figure 2:
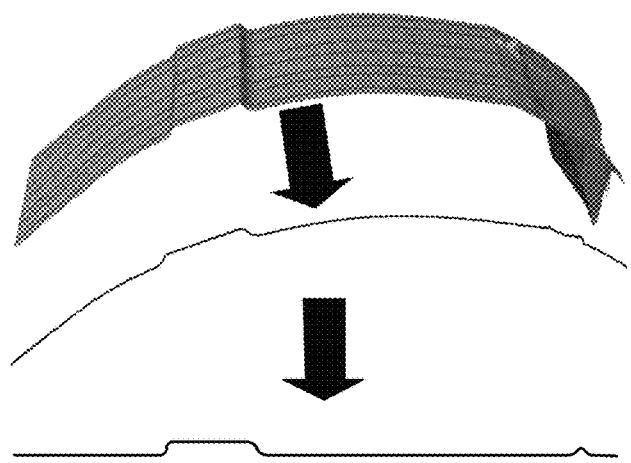
FIG. 2 shows schematically the operation of flattening the image produced during the pre-processing of the image of the surface.
Figure 3:
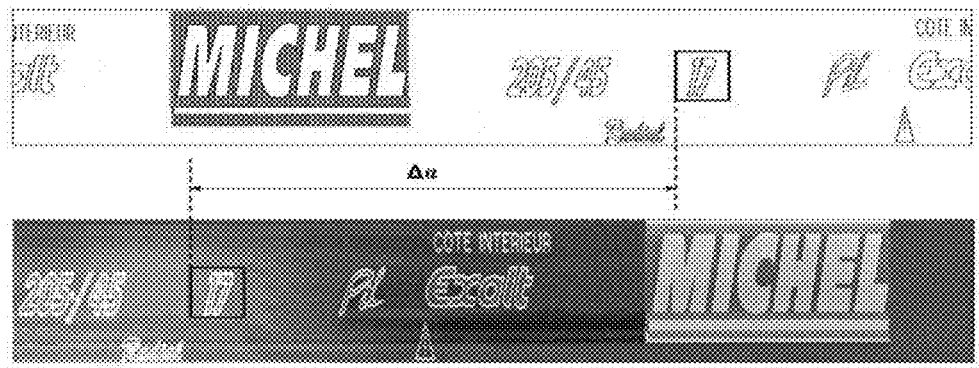
FIG. 3 shows an angular registration operation performed during the pre-processing of the image of the surface.

The operation commonly known as flattening of the profile is then also performed. For this purpose, the mean profile of the curve of the surface is determined in a radial plane, by projecting all the points in the plane formed by the axes OZ and OX', as shown in FIG. 2, which corresponds to a projection in a radial plane. The shape of the mean radial profile will be given by the shape of the point cloud in this radial plane, from which a mean curve may be extracted by taking the mean of the values in a direction OZ. The surface obtained by re-deploying this mean radial profile corresponds substantially to the surface of the tire on which no relief marking would appear.

It is then simply necessary, for each value of the angle θ, to subtract the value of this mean radial profile of the coordinates expressed in the plane OX'Z in order to obtain a flattening of the unrolled surface which was determined above, and in which only the relief elements have a value on the axis OZ.

The flattening may also be performed by following the profile of the surface along a specified path, for example a line in which the value of π is constant, and by detecting the localized variations of the profile which signify relief markings present on said surface. The juxtaposition of these lines also provides a flattened surface on which only the relief elements appear.

When it has been determined, this mean profile is recorded in the list of the main characteristics of the dimension, so that it can be re-used for flattening the tires to be inspected.

By assigning a grey level value to the value on the axis OZ and representing the altitude of the relief elements, we obtain a two-dimensional image of the surface, on which the relief elements are visually distinct from the colour of the mean surface. The latter simplification may be performed with a similar result on the surface flattened according to one of the methods described above.

Figure 5:
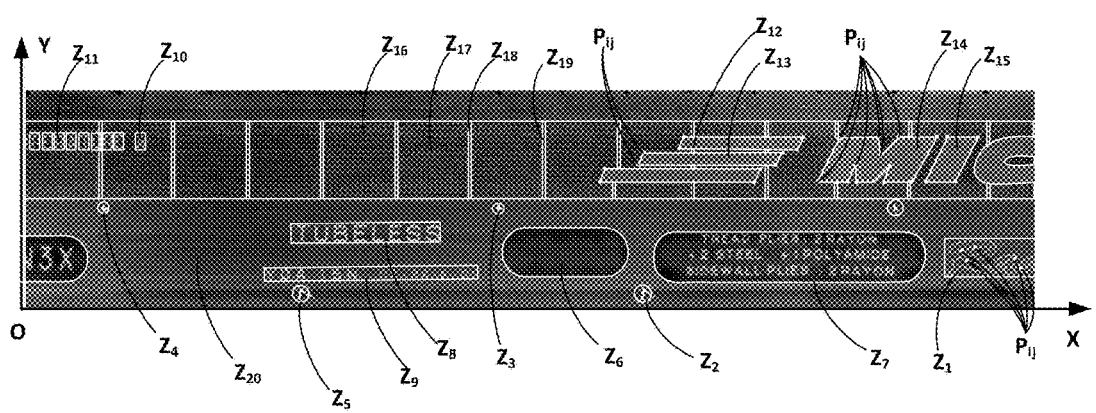
FIGS. 5 and 6 show the shape and positioning of a map on a sidewall of a tire.

In the next step of his operation, the operator, still interacting with the processor, draws up a map of the surface and determines the limits of the various zones of interest. He then assigns to each of these zones of interest the specific registration and checking algorithms which are most suited to the specific characteristics of these zones, as shown in FIG. 5. This determination may be automated, for example if the CAD design data of the mould used to cure the tire are available.

Figure 6:
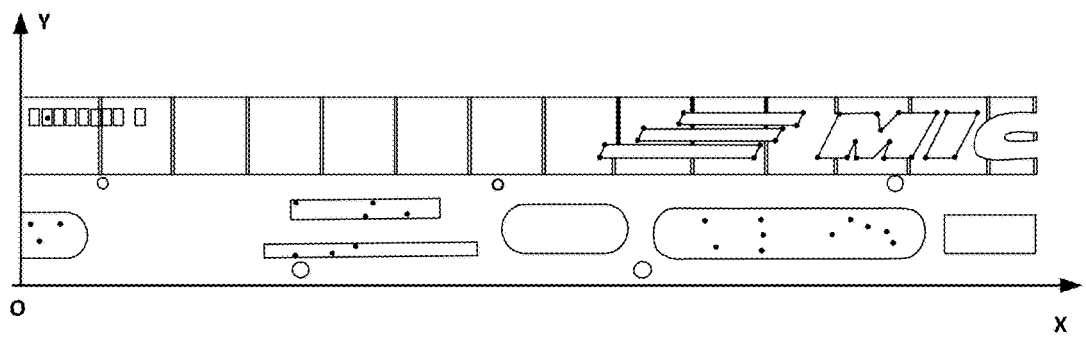

The limits between the zones of interest $Z_i$ having different morphological characteristics, and suitable for the use of different registration and checking algorithms, are thus defined. These boundaries define a map, shown in FIG. 6.

This map, together with the link to the specific algorithms, form part of the main characteristics of the tire.

During the analysis of the surface to be inspected of the tire to be inspected, and in order to be able to compare the image of the surface of the tire to be inspected with the image of the surface of the reference tire, it is found to be necessary to carry out registration of the map.

The registration strategy consists in using data of increasing complexity based on data elements obtained initially from a one-dimensional signature of the image, then from the two-dimensional image and, if necessary, from the three-dimensional image of the tire surface. This strategy may be used to graduate the complexity of the data/algorithms used, while decreasing the surfaces concerned:

Thus the one-dimensional signature is suitable for processing the whole of the surface, the two-dimensional images allow the processing of zones of interest which are very uniform or have little relief, and the three-dimensional images allow the registration of the zones of interest comprising large and varied relief elements.

For the angular registration $\Delta\alpha$ of these two images, a simple procedure is to provide a one-dimensional signature of the reference image by finding the sum of raw data formed by the value of the grey levels of the pixels of a row of the two-dimensional image, or preferably of the three-dimensional image of this reference tire. Thus a 1D curve is produced.

In order to improve the relevance of this signature, it is also possible to perform a preliminary filtering of the image, taking into account, for example, the gradients of grey level or the means of grey level on each of the rows or each of the columns of the image.

By performing the same operation on the tire to be inspected, a second signature is obtained, and, by sliding the two signatures on one another to make them match, a value is found for the circumferential shift to be performed in order to provide an angular match between the angular image of the tire to be inspected and the image of the reference tire.

A similar operation may be performed by finding the sum of the values of the grey levels, raw or filtered, of a column if registration in the radial direction must be carried out.

The 1D signatures, radial and circumferential, raw or filtered, of the reference tire then form part of the main characteristics.

During the analysis of the surface of the tire to be inspected, this first one-dimensional registration, which is usually performed during the pre-processing phase, enables the map to be projected on the surface of the tire to be inspected in order to define the corresponding zones, and enables the registration and checking algorithm predefined by the operator and most closely corresponding to the specific features of the relief of the zone to be applied to these zones.

Figure 4:
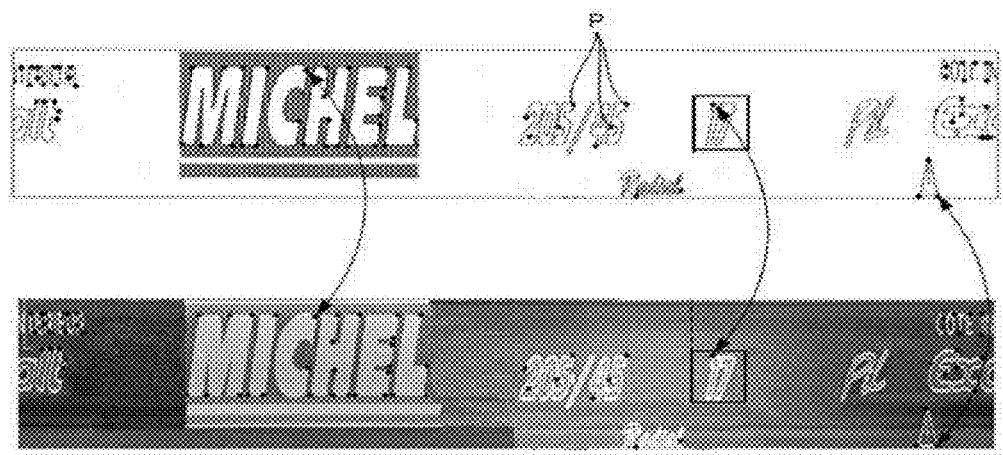
FIG. 4 shows schematically an operation of tracing and matching the characteristic points.

Thus, another, more complex registration operation, this time using the two-dimensional image of the tire surface, consists in determining, in the reference image of the reference tire, some easily detectable characteristic points, so that these can be matched with the same reference points on the surface to be inspected of the tire to be inspected, as shown in FIG. 4.

The characteristic points may be replaced by the contours of characteristic relief elements, forming characteristic sub-images which are portions of the two-dimensional image of the zone of interest concerned.

This matching operation may be used for registering the whole surface, but is preferably applied within a particular zone of interest which may have been determined in advance in an angular registration step of the one-dimensional type, so as to allow the use of simple local transformations such as translations.

Figure 7:
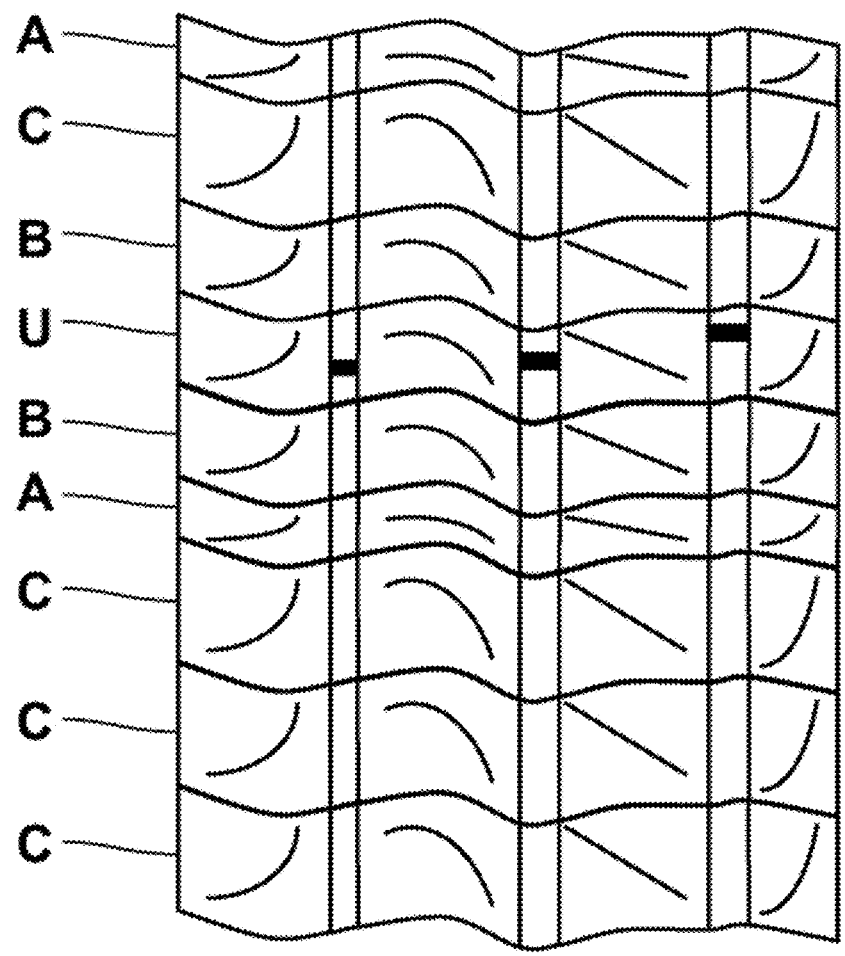
FIG. 7 shows a schematic view of a tread formed by the juxtaposition of elements having basic patterns.

By way of example, we may also cite a specific registration algorithm which is more particularly suited to the zone of interest formed by the tread of the tire, the tread pattern of which is formed by the assembly of circumferentially juxtaposed elements (ABCU) as shown in FIG. 7, these elements being separated from one another by boundaries of identical shape. These elements have basic patterns, in a smaller number, sequenced in a precise and known way, comprising at least one basic pattern on which are arranged wear indicators associated with a characteristic point of this basic pattern.

According to this algorithm, the wear indicators present on the image of the tread of the tire to be inspected are identified. The wear indicators are then grouped into sub-assemblies corresponding to the basic pattern comprising wear indicators, and the characteristic point of each of these sub-assemblies is determined. A sequence of distances is then determined by calculating the distance between the characteristic points of each of the sub-assemblies of wear indicators identified on the surface of the tread to be inspected, and this sequence of distances is made to coincide with the known sequence of distances between the characteristic points of the basic patterns. Finally, the shape of the boundary between the elements is projected on to the surface to be inspected according to the known positioning sequence of said elements.

The sequence of the distances between the characteristic points of the basic patterns of the tread pattern form part of the main characteristics.

A registration algorithm of this type is described, for example, in the publication WO 2012 052300.

The checking algorithm of the tread may then be run, the three-dimensional surface of the three-dimensional image of the surface of the tread of the tire to be inspected being compared with the image of the three-dimensional surface of the tread of the reference tire.

Also by way of example, and in order to illustrate the principles of the method proposed by the present invention, the zones of interest $Z_1$ $Z_{12}$, $Z_{13}$, $Z_{14}$, $Z_{15}$ in the figure are zones of interest arranged on the sidewall of the tire, containing relief elements resembling designs for which specific registration and checking algorithms have been developed. These registrations and checking algorithms have the aim of making the three-dimensional surface of the tire casing to be inspected coincide as accurately as possible with the three-dimensional surface of the reference tire casing, so that moulding anomalies can be determined by difference. A controlled deformation of the surface to be inspected must therefore be carried out in order to allow for very small modifications of positioning caused by the release of the stresses at the moment of removal from the mould, as mentioned above.

These registrations and checking algorithms may be produced when a checking grid of the elementary B-Spline surface type comprising characteristic points $P_{ij}$ is associated with each graphic element of the reference surface. When this association has been completed, the contour of each graphic element of the reference surface is deformed by modifying the location of the characteristic points of the elementary B-Spline surface so as to minimize the distances between the contour of the graphic element of the reference surface and the contour corresponding to it of the graphic element of the surface to be inspected.

A registration and checking algorithm of this type is described, for example, in the publication WO 2012 055748.

Another procedure is to search in an iterative manner for an affine transformation function comprising a homothety whose ratio has an absolute value other than 1. This transformation function is applied to the characteristic points of the reference surface, so that the value representing the sum of the distances between each of the characteristic points of the reference surface, transformed by the transformation function, and the points of the surface to be inspected which are matched to them is minimal.

A specific registration and checking algorithm of this type is described in greater detail in the publication WO 2009/077539.

When this adjustment has been completed, a search is made for the differences between the relief elements of the zone comprising designs of the reference tire and the relief of the same zone belonging to the tire to be inspected.

The characteristic points chosen by the operator to perform these precise registrations are incorporated in the main characteristics of the reference tire, and recorded in the memory of the processor.

The zones of interest $Z_2$, $Z_3$, $Z_4$, are special zones containing a sprue. Sprues, also called stalks, are caused by the ventilation devices placed in the mould to promote the outflow of gases that are obstructed at the time of moulding. Each mould has its own ventilation system.

These sprues give rise to shadow zones, and consequently measurement anomalies around the surface where they are located. A specific algorithm may be used to reconstitute the surface (usually smooth) around the base of each sprue.

On the basis of the three-dimensional image of the surface to be inspected, the algorithm searches for the zones of the surface comprising pixels in which the grey level value is below a given threshold, and determines the boundaries of a containing box. Inside the containing box and for a given line, secant to the zone containing pixels whose grey level value is below a given threshold, each of said pixels is assigned a grey level value equal to the mean grey level value of a set formed by the pixels of a reference segment belonging to said line and placed near the zone in question.

It is also possible to determine the area of the zone of pixels having a grey level value below the given threshold and, if the area of this zone exceeds a given threshold, the angle between the main axis of said zone and the direction of the pixel lines is determined, together with the centre of gravity of said zone. A search is then made for the position of a sprue at one of the ends of the main axis of said zone, and the zone is orientated in a direction extending along the zone and having the base of the sprue as its origin. Each of the lines secant to the zone containing the pixels having a grey level value below the given threshold is then assigned a reference segment positioned on the side of the main axis of said zone corresponding to the angular sector forming a positive angle with the direction of the shadow zone, and the mean grey level value of the pixels of the reference segment is assigned to the set of pixels of the line containing said reference segment and included between the centre of the reference segment and the intersection of said line of pixels with the contour of the base of the sprue.

This specific algorithm is described in greater detail in the publication WO 2012/143197.

By determining the positions of the sprues in advance, it becomes possible to run the checking algorithm described briefly above only in the zones where a sprue is present, so that only a reduced volume of data is processed with a more complex algorithm.

The zones of interest $Z_6$, $Z_7$, $Z_8$, $Z_9$, $Z_{10}$, $Z_{11}$ are zones containing one or more alphanumeric characters.

To ascertain the conformity of the markings, it is then simply necessary to run a specific known algorithm of the optical character recognition (OCR) type.

Among these zones of interest, some zones such as the zone of interest $Z_6$, are of a particular kind, in that the markings that they comprise are formed by removable plates inserted into the mould. These plates are changed every day or every week, and their alignment relative to the surface of the mould may undergo variations. This results in localized variations of relief for which special tolerancing is provided.

In the zones of striations, such as the zones of interest $Z_{16}$, $Z_{17}$, $Z_{18}$ or $Z_{19}$, the undulations of the surface do not form part of a precisely described topography.

The specific algorithms for analysing the conformity of these zones of striations are based on the use of tools for the morphological analysis of the two-dimensional or three-dimensional image of the tire surface. These algorithms provide for the determination of at least one expansion of a base representation comprising a zone of striations, to produce an expanded representation, the determination of at least one erosion of the basic representation, to produce an eroded representation, and the determination of a difference between the expanded representation and the eroded representation to produce a difference representation revealing the anomalies.

These expansions and erosions are based on structuring elements whose size and orientation must be adjusted on the basis of the size and orientation of the striations.

It will be noted that the direction of the striations of the zones of interest $Z_{16}$ and $Z_{17}$ is inverted relative to the striations of the zones of interest $Z_{18}$ and $Z_{19}$.

Therefore, the operator adapts the parameters of the structuring elements to the striations of each of the zones of striations of the reference tire, and records these main characteristics in the memory of the processor for each of the zones concerned.

These structuring elements, together with the specific responses that they generate on the reference surface, form part of the main characteristics.

By applying these specific algorithms only to the zones of striations identified previously, it is again possible to use more complex algorithms on smaller volumes of data.

The zone of interest $Z_{19}$ is a smooth zone in which it is considered that no relief is present.

The registration algorithms assigned to these zones may thus be extremely simple and may be limited, for example, to one-dimensional registration as described above.

The anomalies present on these surfaces may be localized moulding defects or variations in hollows caused by localized deformations of the carcass reinforcement layer, or stains which are detectable because of the excess brightness that they produce.

Accordingly, specific checking algorithms particularly suitable for these surfaces have been developed to check their conformity.

A first specific checking algorithm is described, for example, in the publication WO2012/156262. This checking algorithm is based on the analysis of the three-dimensional grey level image of the surface.

According to this publication, steps are executed in which, using linear structuring elements of successively increasing size orientated in the circumferential direction, a series of morphological openings is made in the image of the tire surface. The value of the image obtained after morphological opening with a given structuring element is then reduced by subtracting the value of the image obtained after morphological opening using the structuring element having the next lower size, so as to obtain a sequence of images flattened by difference, the procedure being initialized by the subtraction of the image obtained using the structuring element of smaller size. Finally, thresholding is performed on the images flattened by difference, to obtain binary images, and the set union of the values of each of the binary images is performed to obtain a final binary image in which only the marking patterns appear in relief.

The separate patterns in the binary image of the surface are then identified, and the image of the curvature of said surface is determined by difference with the initial image of the tire surface, the relief markings in the image of curvature having been removed, leaving only the localized deformations of the surface mentioned above.

It should be noted here that this type of algorithm may also be used to determine the mean radial profile for use in flattening during the pre-processing phase.

Another checking algorithm, particularly suitable for checking internal surfaces, is also based on the analysis of the texture of the three-dimensional image of the surface, and also makes use of the tools of morphological analysis. A specific algorithm of this type is described, for example, in the publication WO 2013/045593.

According to this publication, by using factor spaces in which the data are formed by morphological filters and the variables are formed by the multivariate images of the tire surface comprising previously identified anomalies, series of morphological filters which are most suitable for highlighting said anomalies are determined. These series of filters are then applied to the image of the tire to be inspected, and the presence of these anomalies is detected with the aid of a classifier.

These morphological filters, together with the responses to the texture characterizations that they generate on the reference surface, form part of the main characteristics.

It should be noted here that some non-conformities are not specific to the nature of the relief created by concave relief elements of the mould. This is the case, for example, with air inclusions between two internal layers of material, which may be detected as a result of the localized deformation that they produce on the surface.

A specific algorithm for detecting these anomalies is described in the publication WO 2014/198777.

According to this algorithm, on the basis of the three-dimensional digital image of the surface of a tire to be inspected, an image of the orientation of the elevation gradients of the surface is formed, in which each point of the image is assigned a grey level value proportional to the angle formed with a direction given by the projection in the image plane of a non-zero norm vector substantially corresponding, at this point, to the gradient vector tangent to the surface and orientated in the direction of the greatest slope. A filtered image of the orientations is then determined, by transforming the image of the orientation of the elevation gradients using a digital filter capable of selecting the zones comprising structures similar to a reference image of the orientation of the elevation gradients of a blow hole having the greatest slope.

This reference image of the orientation of the elevation gradients of a blow hole having the greatest slope, which takes the form of a circumferential gradation of grey levels, is then considered to be a main characteristic of the dimension, and is stored in the memory of the processor.

When checking tires to be inspected, the operator may then choose whether to have this specific algorithm run by the processor in all zones, or only in certain specific zones that are more sensitive to the appearance of these air inclusions.

Among all the specific checking algorithms available to the operator and stored in the processor memory, some may be considered as first-level algorithms. These particular algorithms require less calculation time and may be used to identify rapidly whether the zone in which they are run comprises an element that may give rise to doubt as to the presence of a defect. It is then advisable to run these so-called first-level algorithms and decide, on the basis of the result, whether or not it is useful to launch one of the more resource-intensive specific algorithms.

Among these reduced algorithms it is possible, for example, to calculate, for relief resembling a design, the geometric moment or the moment of inertia of the surface defined by the contours of this design relative to a characteristic point. More specifically, the calculation of the Zernike moment, as described in the paper "Invariant image recognition by Zernike moments" by Alizea Khotanzad and Yaw Hua Hong, IEEE Transactions and Pattern Analysis and Machine Intelligence, Vol. 12, No. 5, May 1990, appears equally suitable for detecting first-level errors in the design zones and in the zones containing alphanumeric characters.

Comparison by superimposition between the contour of the reference image present in the zone of interest of the reference tire and the contour of the image, present in the same zone, of the tire to be inspected may also prove to be a valuable tool. The contour of the images may be obtained, in a known way, on the basis of the two-dimensional image or the three-dimensional image of the surface.

More simply, it is also possible to calculate distances between certain carefully chosen characteristic points, or to make geometric measurements such as the calculation of the angles formed by straight lines passing between these points.

The shape of the contours, the geometric moments, the geometric measurements, and the characteristic points of the relief elements of the reference tire are considered to be main characteristics and are recorded in the processor memory.

The set of specific or reduced registration and checking algorithms forms a collection of algorithms which is also stored in the processor memory.

On completion of this operation of analysing the surface of the reference tire performed by the operator by interaction with the processor, we obtain an enriched base in which each zone of interest of the tire is associated with one or more characteristic registration and checking algorithms for which the choice of the main characteristics is determined.

When the tires produced from the same mould as the reference tire are inspected in the course of routine operation, it is simply necessary to carry out the pre-processing operations as described above in succession, to register the image of the surface, and to superimpose the map on the image of the tire to be inspected so that the zones of interest are identified.

The processor then automatically runs the specific registration and checking algorithms defined for each of the zones, making use of the main characteristics assigned to these algorithms and stored previously as described above.

The result of the execution of these calculations enables the conformity of the tire to be determined.

The set formed by the image of the reference surface of the reference tire, the main characteristics, the map with the optimal registration principle associated with it, and the choice of registration and checking algorithms to be run for each of the zones of interest constitutes the basic model for the optimal checking of a tire to be inspected that is produced from the same mould as the reference tire.

This basic model must be adapted whenever an operation such as drilling a vent hole or changing a plate is performed on the mould.

By means of a few minor modifications, relating to the position of the vent holes for example, this basic model may easily be adapted to serve as a basic model for a reference tire produced from a different mould of the same size.

By means of a few additional adaptations, it may also serve as a basic model for different sizes of the same model of tire having different diameters.

Finally, the collection of specific algorithms may be used to create basic models for tires of different sizes.

Thus a hierarchical arrangement of the basic models is obtained, these models being grouped on the basis of the resemblances between the different algorithms used.

The invention claimed is:

1. A method for inspecting an inspection surface of a tire to be inspected by comparison with a reference surface of a reference tire, the inspection surface and the reference surface including relief elements or markings, the method comprising steps of:
   capturing, using an image acquisition system, a reference image of a surface of a reference tire, the reference tire being selected from a manufacturing process and considered to be in conformity, the reference image being formed of: a two-dimensional grey-level or color image, and a three-dimensional grey-level image for which each point is assigned a grey-level value proportional to a topographic elevation of the point;
   transmitting data of the reference image to a processor having a memory storing coded instructions that, when executed, performs an automated inspection method;
   parameterizing main characteristics of the reference image via interactions of an operator with the processor, and storing the main characteristics in the memory of the processor;
   producing a reference map of the surface of the reference tire by dividing the reference image into a plurality of zones of interest, each of the zones of interest including a characteristic shape or relief element, the zones of interest being separated by boundaries;
   for each of the zones of interest of the reference map, assigning a specific registration and checking algorithm to the zone of interest in increasing order of complexity, from: (a) an algorithm matching one-dimensional signatures and angular registration, (b) an algorithm matching characteristic points, (c) an algorithm matching characteristic subimages, and (d) an algorithm matching relief elements in three dimensions, the specific registration and checking algorithm being chosen from a collection of algorithms established previously and stored in the memory of the processor;
   capturing, using the image acquisition system, an inspection image of a surface of a tire under inspection that was produced by a same mold as the reference tire and that is different from the reference tire;
   transmitting data of the inspection image to the processor; and
   performing, using the processor, the automated inspection method based on the main characteristics parameterized previously and recorded in the memory of the processor, the processor executing coded instructions to:
   perform at least one pre-processing of the inspection image,
   superimpose the reference map on the inspection image in order to determine zones of interest of the inspection image, and,
   for each of the zones of interest of the inspection image, run the specific registration and checking algorithm chosen for a corresponding one of the zones of interest of the reference map, to determine a conformity of the tire under inspection.

2. The method according to claim 1, wherein the pre-processing of the inspection image includes performing at least algorithm chosen from:
   an algorithm for flattening a radial profile of the inspection image,
   an algorithm for converting polar coordinates of the inspection image to Cartesian coordinates, the polar coordinates being expressed relative to an axis of rotation of the tire under inspection, and the inspection image corresponding to an image of a sidewall surface of the tire under inspection, and
   an algorithm for performing corrections relating to defects in an optical system of the image acquisition system.

3. The method according to claim 1, wherein the step of parameterizing the main characteristics of the reference image involves data chosen from:
   a sum of grey-level values of columns and rows of raw or filtered data of the three-dimensional grey-level image, forming a one-dimensional signature,
   a mean curvature of a sidewall of the reference tire,
   a shape of a contour of a characteristic relief element present in a given zone of interest of the reference map, forming characteristic subimages in two dimensions,
   one or more characteristic points of a characteristic relief element present in a zone of interest of the reference map,
   a geometric moment,
   one or more geometric measurements between characteristic points,
   a response to a morphological operator based on a structuring element having a given shape and orientation,
   an image of an orientation of elevation gradients with a steepest slope of a blow hole, and
   morphological filters and responses to texture characterizations.

4. The method according to claim 3, wherein the collection of algorithms includes at least one registration algorithm for causing a relief element of a zone of interest of the reference map to coincide with a relief element of a zone of interest of the inspection image.

5. The method according to claim 1, wherein the collection of algorithms includes first level algorithms based on comparison analyses, including at least one of:
- an algorithm for comparing contours of characteristic subimages,
- an algorithm for comparing geometric measurements between characteristic points, and
- an algorithm for comparing geometric moments.

6. The method according to claim 1, wherein the collection of algorithms includes at least one algorithm for analyzing zones of interest that include an alphanumeric character as a characteristic relief element.

7. The method according to claim 1, wherein the collection of algorithms includes at least algorithm for analyzing zones of interest that include a striation as a characteristic relief element.

8. The method according to claim 1, wherein the collection of algorithms includes at least one algorithm for analyzing zones of interest that include a smooth relief element as a characteristic relief element.

9. The method according to claim 1, wherein the collection of algorithms includes at least one algorithm for analyzing zones of interest that include a removable plate as a characteristic relief element.

10. The method according to claim 1, wherein the collection of algorithms includes at least one algorithm for analyzing zones of interest that include a sprue as a characteristic relief element.

11. The method according to claim 1, wherein the collection of algorithms includes at least one algorithm for analyzing zones of interest that include a tread element as a characteristic relief element.

12. The method according to claim 1, wherein the collection of algorithms includes at least one algorithm for analyzing zones of interest that include a wear indicator as a characteristic relief element.

13. The method according to claim 1, wherein the collection of algorithms includes at least one algorithm for analyzing zones of interest that include texture as a characteristic relief element.

14. A non-transitory memory device storing coded instructions that, when executed by a computer processor, causes the processor to perform an automated inspection method for comparing an inspection image of a surface of a tire under inspection with a reference image of a surface of a reference tire, the automated inspection method comprising steps of:
- performing at least one pre-processing of the inspection image;
- based on main characteristics of the reference image, superimposing a reference map on the inspection image in order to determine zones of interest of the inspection image; and,
- for each of the zones of interest of the inspection image, running a specific registration and checking algorithm chosen for a corresponding zone of interest of the reference map, to determine a conformity of the tire under inspection, wherein the reference tire is selected from a manufacturing process and considered to be in conformity, wherein the tire under inspection was produced by a same mold as the reference tire and that is different from the reference tire, wherein the inspection image and the reference image were captured using a same image acquisition system, wherein data of the reference image and data of the inspection image are stored in the memory device, wherein the main characteristics of the reference image are stored in the memory device based on a previous interaction of an operator with the processor, wherein the reference image is formed of:
a two-dimensional grey-level or color image, and
a three-dimensional grey-level image for which each point is assigned a grey-level value proportional to a topographic elevation of the point, wherein the reference map is produced by dividing the reference image into a plurality of zones of interest, each of the zones of interest including a characteristic shape or relief element, the zones of interest being separated by boundaries, and wherein a specific registration and checking algorithm is assigned to each of the zones of interest of the reference map, in increasing order of complexity, from: (a) an algorithm matching one-dimensional signatures and angular registration, (b) an algorithm matching characteristic points, (c) an algorithm matching characteristic subimages, and (d) an algorithm matching relief elements in three dimensions, the specific registration and checking algorithm being chosen from a collection of algorithms established previously and stored in the memory device.

* * * * *

UNITED STATES PATENT AND TRADEMARK OFFICE
CERTIFICATE OF CORRECTION

PATENT NO. : 10,346,971 B2
APPLICATION NO. : 15/741378
DATED : July 9, 2019
INVENTOR(S) : Régis Vinciguerra et al.

Page 1 of 1

It is certified that error appears in the above-identified patent and that said Letters Patent is hereby corrected as shown below:

In the Specification

Column 1:
Line 21, "consist in" should read --consist of--.

Column 1:
Line 58, "WO2009077539" should read --WO 2009/077539--.

Column 6:
Line 59, "π" should read --ρ--.

Column 8:
Line 55, "2012 052300" should read --2012/052300--.

Column 9:
Line 22, "2012 055748" should read --2012/055748--.

In the Claims

Column 14:
Line 35, "least" should read --least one--.

Column 15:
Line 19, "least" should read --least one--.

Signed and Sealed this
Thirty-first Day of December, 2019

Andrei Iancu
*Director of the United States Patent and Trademark Office*